United States Patent
Lei

(10) Patent No.: US 12,228,923 B2
(45) Date of Patent: Feb. 18, 2025

(54) REMOTE DRIVING METHOD, APPARATUS, AND SYSTEM, DEVICE, AND MEDIUM

(71) Applicant: Tencent Technology (Shenzhen) Company Limited, Shenzhen (CN)

(72) Inventor: Yixue Lei, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 232 days.

(21) Appl. No.: 17/963,762

(22) Filed: Oct. 11, 2022

(65) Prior Publication Data

US 2023/0030446 A1    Feb. 2, 2023

Related U.S. Application Data

(63) Continuation of application No. PCT/CN2021/106056, filed on Jul. 13, 2021.

(30) Foreign Application Priority Data

Aug. 31, 2020  (CN) .......................... 202010895926.7

(51) Int. Cl.
*G05D 1/00* (2024.01)
*G06Q 10/06* (2023.01)
(Continued)

(52) U.S. Cl.
CPC .......... *G05D 1/0022* (2013.01); *G05D 1/0077* (2013.01); *G06Q 10/06393* (2013.01); *G07C 5/008* (2013.01); *G07C 5/0808* (2013.01)

(58) Field of Classification Search
CPC .. G05D 1/0022; G05D 1/0077; G05D 1/0011; G06Q 10/06393; G07C 5/008; G07C 5/0808; Y02D 30/70; G08G 1/096725; G08G 1/096775; G08G 1/096783; H04W 4/021; H04W 4/44

See application file for complete search history.

(56) References Cited

U.S. PATENT DOCUMENTS

| | | | |
|---|---|---|---|
| 2021/0018934 A1* | 1/2021 | Tarao | H04W 4/46 |
| 2021/0024089 A1* | 1/2021 | Ito | G05D 1/0011 |

FOREIGN PATENT DOCUMENTS

| | | |
|---|---|---|
| CN | 2018142921 A | 9/2018 |
| CN | 109891473 A | 6/2019 |

(Continued)

OTHER PUBLICATIONS

International Search Report and Written Opinion for PCT/CN2021/106056 mailed Oct. 12, 2021 including translation of the International Search Report and Written Opinion (17 pages).

*Primary Examiner* — Brian P Sweeney
(74) *Attorney, Agent, or Firm* — Crowell & Moring LLP

(57) ABSTRACT

This application discloses a remote driving method, apparatus, and system, a device, and a medium, and relates to the field of intelligent driving. The method includes: obtaining working condition information of a vehicle; and determining a dynamic safety region for the vehicle according to the working condition information; the dynamic safety region being a region in which vehicle autonomous driving is used and no remote control driving is required, or the dynamic safety region being a region in which the vehicle autonomous driving is used and a degree of involvement of the remote control driving is lower than a predetermined degree.

18 Claims, 5 Drawing Sheets

(51) Int. Cl.
*G06Q 10/0639* (2023.01)
*G07C 5/00* (2006.01)
*G07C 5/08* (2006.01)

(56) References Cited

FOREIGN PATENT DOCUMENTS

| CN | 110264720 A | 9/2019 |
| CN | 111071263 A | 4/2020 |
| CN | 111497865 A | 8/2020 |
| CN | 111580522 A | 8/2020 |
| CN | 112037553 A | 12/2020 |

\* cited by examiner

REMOTE DRIVING METHOD, APPARATUS, AND SYSTEM, DEVICE, AND MEDIUM

RELATED APPLICATION

This application is a continuation of International Application No. PCT/CN2021/106056, filed Jul. 13, 2021, which claims priority to Chinese Patent Application No. 202010895926.7, entitled "REMOTE DRIVING METHOD, APPARATUS, AND SYSTEM, DEVICE, AND MEDIUM" filed on Aug. 31, 2020. The contents of International Application No. PCT/CN2021/106056 and Chinese Patent Application No. 202010895926.7 are each incorporated by reference in their entirety.

FIELD OF THE TECHNOLOGY

Embodiments of this application relate to the field of intelligent driving, and in particular, to a remote driving method, apparatus, and system, a device, and a medium.

BACKGROUND OF THE DISCLOSURE

Intelligent connected vehicle refers to organic union of the Internet of Vehicles (IoV) and intelligent vehicles.

An intelligent connected vehicle supports vehicle autonomous driving above L3 and remote control driving. Vehicle autonomous driving, briefly referred to as automated driving, is a driving technology that achieves automated driving through single vehicle intelligence, that is, by using an apparatus such as a camera, a millimeter wave radar, or a lidar. Remote control driving, briefly referred to as remote driving, is a driving technology achieved through remote control by a staff member of a server after driving rights are given to the server.

However, the remote control driving needs to consume computing resources of the server. As a result, if a plurality of vehicles continuously use the remote control driving technology, heavy computing load can be caused on the server.

SUMMARY

Embodiments of this application provide a remote driving method, apparatus, and system, a device, and a medium, so that use of remote control driving can be avoided or reduced in a dynamic safety region, thereby reducing computing load of a server. The technical solutions are as follows:

According to one aspect of this application, a remote driving method is provided, applied to a remote driving entity, and including:
  obtaining working condition information of a vehicle; and
  determining a dynamic safety region for the vehicle according to the working condition information;
  the dynamic safety region being a region in which vehicle autonomous driving is used and no remote control driving is required, or the dynamic safety region being a region in which the vehicle autonomous driving is used and a degree of involvement of the remote control driving is lower than a predetermined degree.

According to another aspect of this application, a remote driving apparatus is provided, including:
  an obtaining module, configured to obtain working condition information of a vehicle; and
  a determining module, configured to determine a dynamic safety region for the vehicle according to the working condition information;
  the dynamic safety region being a region in which vehicle autonomous driving is used and no remote control driving is required, or the dynamic safety region being a region in which the vehicle autonomous driving is used and a degree of involvement of the remote control driving is lower than a predetermined degree.

According to another aspect of this application, a remote driving system is provided, including a remote driving entity and a communication network entity;
  the remote driving entity being configured to obtain working condition information of a vehicle from the communication network entity; and determine a dynamic safety region for the vehicle according to the working condition information;
  the dynamic safety region being a region in which vehicle autonomous driving is used and no remote control driving is required, or the dynamic safety region being a region in which the vehicle autonomous driving is used and a degree of involvement of the remote control driving is lower than a predetermined degree.

In an optional design of this application, the working condition information includes at least one of the following information:
  terminal capability information of the vehicle;
  connection performance of a network connection, the connection performance including at least one of connection reliability and connection quality, and the network connection being a connection between the remote driving entity and the vehicle;
  a traveling location of the vehicle;
  map information of a region in which the vehicle is located;
  legacy vehicle information of the region in which the vehicle is located, the legacy vehicle information being information about a vehicle supporting no networking function; and
  vulnerable road user (VRU) information of the region in which the vehicle is located.

In an optional design of this application, the vehicle is configured to report terminal capability information to the remote driving entity; and
  the remote driving entity is configured to receive the terminal capability information reported by the vehicle.

In an optional design of this application, the communication network entity includes a network monitoring and prediction entity,
  the network monitoring and prediction entity being configured to monitor or predict connection performance of a network connection, the network connection being a network connection between the remote driving entity and the vehicle, and the connection performance including at least one of connection reliability and connection quality; and
  the remote driving entity is configured to obtain the connection performance of the network connection from the network monitoring and prediction entity.

In an optional design of this application, the communication network entity includes a location service entity,
  the location service entity being configured to position a traveling location of the vehicle; and
  the remote driving entity is configured to obtain the traveling location of the vehicle from the location service entity.

In an optional design of this application, the communication network entity includes a map information entity, the map information entity being configured to collect and store map information, the map information including basic map information and real-time road information; and the remote driving entity is configured to obtain map information of the region in which the vehicle is located from the map information entity.

In an optional design of this application, the communication network entity includes a roadside perception entity, the roadside perception entity being configured to collect legacy vehicle information and VRU information on a road; and the remote driving entity is configured to obtain at least one of the legacy vehicle information and the VRU information of the region in which the vehicle is located from the roadside perception entity.

In an optional design of this application, there are at least two types of working condition information corresponding to respective priorities; and the remote driving entity is configured to determine the dynamic safety region for the vehicle by preferentially using working condition information with a high priority.

In an optional design of this application, there is first working condition information and second working condition information, and a priority of the first working condition information is higher than a priority of the second working condition information; and the remote driving entity is configured to determine a first dynamic safety region for the vehicle according to the first working condition information with a high priority; and determine a second dynamic safety region for the vehicle in the first dynamic safety region according to the second working condition information with a low priority.

In an optional design of this application, conditions for determining the dynamic safety region include at least one of the following conditions:

a key performance indicator (KPI) of the network connection in a target region reaches a threshold required by the remote control driving, the network connection being a connection between the remote driving entity and the vehicle;

there is no hazardous road condition in the target region;

a distribution status of legacy vehicles in the target region meets a first safety condition; and a distribution status of VRUs in the target region meets a second safety condition;

the target region being a candidate region for the dynamic safety region.

In an optional design of this application, the remote driving entity is configured to use a target driving policy for the vehicle in a case that the vehicle is in the dynamic safety region;

the target driving policy including at least one of the following policies:

skipping using the remote control driving;

performing the remote control driving only in an emergency situation; and performing remote driving with a first computing power resource, the first computing power resource being less than a target resource threshold.

In an optional design of this application, the dynamic safety region is divided according to a granularity, the granularity including at least one of an administrative region, a road section, and a lane.

According to another aspect of this application, a computer device is provided, including a processor and a memory, the memory storing at least one instruction, at least one program, a code set, or an instruction set, and the at least one instruction, the at least one program, the code set, or the instruction set being loaded and executed by the processor to implement the remote driving method in the foregoing aspects.

According to another aspect of this application, a computer-readable storage medium is provided, storing at least one instruction, at least one program, a code set, or an instruction set, the at least one instruction, the at least one program, the code set, or the instruction set being loaded and executed by a processor to implement the remote driving method in the foregoing aspects.

The technical solutions provided in the embodiments of this application produce at least the following beneficial effects:

A remote driving entity determines a dynamic safety region for a vehicle according to working condition information. Vehicle autonomous driving is used for the vehicle in the dynamic safety region, and use of remote control driving is not required or only remote control driving with a relatively low degree of involvement is used. Therefore, the remote driving entity can control the vehicle with no computing power or with a small amount of computing power while ensuring safety of the vehicle, thereby saving computing resources of the remote driving entity.

DESCRIPTION OF EMBODIMENTS

First, several terms involved in this application are introduced.

Level L0 automated driving provides only warnings and instantaneous assistance, such as automatic emergency braking, visual blind spot reminder, and a vehicle body stabilization system.

Level L1 automated driving allows braking, acceleration, or steering, such as lane departure correction or adaptive cruise control.

Level L2 automated driving allows braking, acceleration, or steering, such as lane departure correction and adaptive cruise control.

Level L3 automated driving allows driving of a vehicle under restricted conditions, such as automated driving in the presence of traffic congestion.

Level L4 automated driving allows driving of a vehicle under restricted conditions, such as driving of a self-driving taxi in a city, where pedals/steering devices may not be required.

Level L5 automated driving allows driving of a vehicle under any condition, such as a case similar to L4 but in which automated driving can be achieved under any condition.

An entity is a computational logic unit implemented by a combination of software and hardware. The entity may correspond to one server, a plurality of servers, a cloud service, or a virtual computing unit in a cloud service. For example, each entity is a server. For another example, some entities are independent servers, and some entities are virtual computing units in cloud services. For another example, one or more entities are integrated on one server, and one or more entities are integrated in one cloud service.

Figure 1:
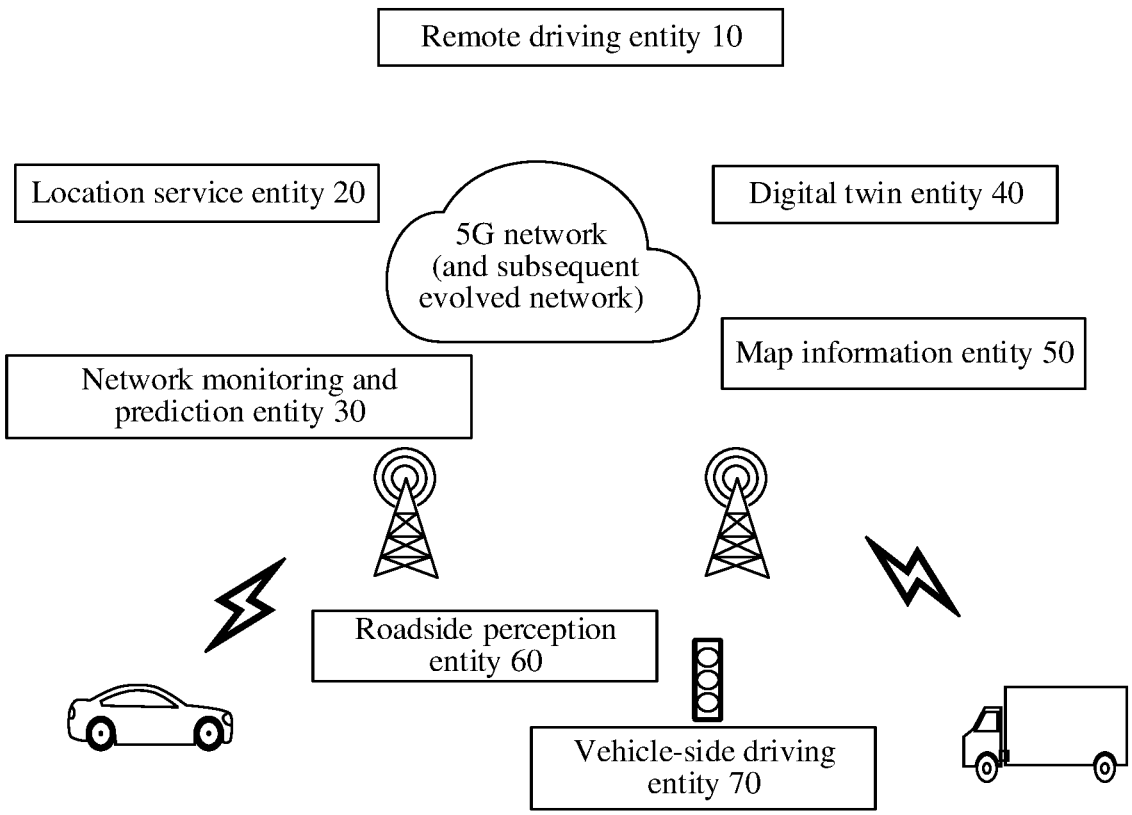
FIG. 1 is a block diagram of a remote driving system according to an exemplary embodiment of this application.

FIG. 1 is a structural diagram of an automated driving system according to an embodiment of this application. The automated driving system includes a remote driving entity 10, a location service entity 20, a network monitoring and prediction entity 30, a digital twin entity 40, a map information entity 50, a roadside perception entity 60, and a vehicle-side driving entity 70.

The remote driving entity 10 is configured to provide a control function of remote driving for a vehicle, and is also referred to as a remote control driving entity.

The location service entity 20 is configured to position a traveling location of the vehicle, including, but not limited to, at least one of general precision positioning and high precision positioning. For example, the high precision positioning is lane-level positioning. There is a network connection between the location service entity 20 and the remote driving entity 10. The remote driving entity 10 obtains the traveling location of the vehicle from the location service entity 20. The traveling location includes: a geographical location during traveling and a geographical location during a stop. The stop includes at least one of: a complete stop, a transient stop indicated by a traffic light, an intermediate stop in an event of a breakdown or an accident.

The network monitoring and prediction entity 30 is configured to monitor connection reliability and connection quality of a 5G network (and a subsequent evolved communication system), and predict the connection reliability and the connection quality. For example, there is a network connection between the network monitoring and prediction entity 30 and the remote driving entity 10. The network monitoring and prediction entity 30 is configured to monitor or predict connection performance of the network connection, the network connection being a network connection between the remote driving entity and the vehicle, and the connection performance including at least one of connection reliability and connection quality. The remote driving entity 10 is configured to obtain the connection performance of the network connection from the network monitoring and prediction entity 30.

The digital twin entity 40 is configured to virtually present a road condition of the vehicle, other vehicles nearby, VRUs, and other information to assist the remote driving entity 10 in decision making, such as displaying the road condition of the vehicle, other vehicles nearly, VRUs, and other information by using a plurality of arc-shaped display screens arranged in parallel, for reference for an operator (remote driver) of the remote driving entity 10.

The map information entity 50 is configured to provide collection and storage of map information. For example, the map information includes basic map information (such as a high precision map) and real-time road information. For example, the real-time road information includes: whether there is a landslide, whether there is a car accident, whether there is a rainstorm and hail, and the like. There is a network connection between the map information entity 50 and the remote driving entity 10. The remote driving entity 10 is configured to obtain map information of the region in which the vehicle is located from the map information entity.

The roadside perception entity 60 is configured to perceive a building, a facility, a legacy vehicle, a pedestrian, a bicycle, a motorcycle, and the like near the vehicle. There is a network connection between the roadside perception entity 60 and the remote driving entity 10. The roadside perception entity 60 is configured to collect legacy vehicle information and VRU information on a road. The remote driving entity 10 is configured to obtain at least one of the legacy vehicle information and the VRU information of the region in which the vehicle is located from the roadside perception entity 60.

The vehicle-side driving entity 70 is configured to implement, on a vehicle side, perception, calculation, decision making, and execution function during automated driving. The vehicle-side driving entity 70 is configured to implement vehicle autonomous driving of the vehicle. The vehicle-side driving entity 70 is provided in the vehicle. In this application, the vehicle autonomous driving may be vehicle automated driving, or may be manual driving of the vehicle by a driver, or may be a combination of vehicle automated driving and manual driving of the vehicle by a driver.

The network connection may be a wired network, a wireless network, a mobile communication network, or a virtual network between entities in a cloud service. A specific type of the network connection is not limited in this application.

Figure 2:
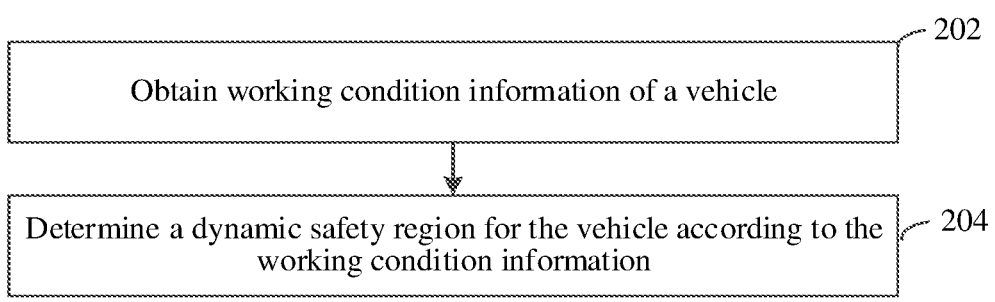
FIG. 2 is a flowchart of a remote driving method according to an exemplary embodiment of this application.

FIG. 2 is a flowchart of a remote driving method according to an embodiment of this application. This embodiment is described by using an example in which the method is applied to the remote driving entity 10 shown in FIG. 1. The method includes:

Step 202: Obtain working condition information of a vehicle.

The vehicle is a vehicle supporting a remote driving function, such as an intelligent connected vehicle. Optionally, the vehicle further supports an automated driving function. The automated driving function is a function of autonomous driving based on data collected by the vehicle according to devices such as sensors and radar.

For example, the working condition information of the vehicle includes at least one of the following information:
terminal capability information of the vehicle;
connection performance of a network connection between the entity and the vehicle, the connection performance including at least one of connection reliability and connection quality;
a traveling location (or other expressions such as a driving location, location information, a geographical location, a positioning location, or positioning information) of the vehicle;
map information of a region in which the vehicle is located;
legacy vehicle information of the region in which the vehicle is located;
the legacy vehicle information being used for indicating vehicle information of a legacy vehicle that does not support a function based on networking, or the legacy vehicle information being vehicle information of a legacy vehicle that does not support a networking function; the networking function being a function of communicating with the remote driving entity through a mobile communication network by the vehicle; and the mobile communication network including, but not limited to: 4G, 5G and subsequent evolved networks, a cellular V2X (C-V2X), dedicated short range communications (DSRC), and the like, where for example, the legacy vehicle cannot perform V2X communication with a current vehicle to coordinate driving behaviors, and/or the legacy vehicle does not support remote control driving through a remote driving entity located on a cloud; and VRU information of the region in which the vehicle is located.

The VRU information includes at least one of: a pedestrian, a bicycle, a motorcycle, an electric bike, a tricycle, a scooter, wildlife, and a pet.

Step 204: Determine a dynamic safety region for the vehicle according to the working condition information.

The dynamic safety region is a region in which vehicle autonomous driving is used and no remote control driving is required, or the dynamic safety region is a region in which the vehicle autonomous driving is used and a degree of involvement of the remote control driving is lower than a predetermined degree. In the following description, the vehicle autonomous driving is briefly referred to as autonomous driving, and the remote control driving is briefly referred to as remote driving.

The dynamic safety region is a safety region in which a safety coefficient of a traveling environment of a controlled vehicle is higher than a target threshold. Alternatively, the dynamic safety region is a region in which the remote driving entity determines a safety level of a traveling environment of a controlled vehicle as safe.

The dynamic safety region is related to the traveling location of the vehicle, a condition of a road that the vehicle is on, and a single vehicle perception capability and a networking support capability of the vehicle, and is a region range for which it can be basically determined that an autonomous driving operation is to be performed without a need of remote takeover, for example, all lanes within 3 kilometers forward with the current traveling location of the vehicle as a reference point. This region varies over time and is related to a single vehicle driving capability or a support capability of obtaining target and road condition information from a road side through the networking function of the vehicle.

For the same vehicle, the dynamic safety region may vary over time, and the dynamic safety region may vary with a current location of the vehicle. That is, the dynamic safety region is not fixed.

In different embodiments, the dynamic safety region may be further referred to as: a safety region, a dynamic region, an autonomous driving region, a non-takeover region, a low risk region, a region without remote control, or other names. This is not limited in this application.

In an example, a target region is a region determined by using the traveling location of the vehicle as a reference. The target region is a candidate region for the dynamic safety region. The principle of determining the target region as the dynamic safety region by the remote driving entity includes, but is not limited to, at least one of the following:

A KPI of the network connection in the target region reaches a threshold required by the remote control driving.

For example, a KPI of the network connection between the vehicle and the remote driving entity is higher than the threshold. The KPI includes at least one of: an access capability, a holding capability, mobility, service integrity, utilization, availability, and a service capability. The service integrity includes an average throughput of uplink/downlink users and an average throughput of uplink/downlink cells. The utilization includes physical resource block (PRB) utilization, CPU utilization, and the like.

There is no hazardous road condition in the target region.

A special road condition includes at least one of: a car accident, a landslide, a rockfall, a flood, a road collapse, and an errant vehicle.

A distribution status of legacy vehicles in the target region meets a first safety condition.

A legacy vehicle cannot perform V2X communication with the current vehicle to coordinate driving behaviors, and/or the legacy vehicle does not support remote control driving through a remote driving entity located on a cloud. Therefore, a peripheral region of the legacy vehicle is not suitable for classification as a dynamic safety region. A region in which the legacy vehicle does not affect the current vehicle can be classified as a dynamic safety region. A region in which the legacy vehicle may affect the current vehicle cannot be classified as a dynamic safety region.

For example, the assessment of whether the legacy vehicle affects safety of the current vehicle may be obtained by performing a collision prediction based on at least one of the following factors: locations of the legacy vehicle and the current vehicle, traveling directions of the legacy vehicle and the current vehicle, a relative speed between the legacy vehicle and the current vehicle, whether the legacy vehicle and the current vehicle are in the same lane, and a distance between the legacy vehicle and the current vehicle.

A distribution status of VRUs in the target region meets a second safety condition.

Due to an unpredictable action mode of a VRU, a peripheral region of the VRU is not suitable for classification as a dynamic safety region. A region in which the VRU does not affect the current vehicle can be classified as a dynamic safety region. A region in which the VRU may affect the current vehicle cannot be classified as a dynamic safety region.

For example, the assessment of whether the VRU affects safety of the current vehicle may be obtained by performing a collision prediction based on at least one of the following factors: locations of the VRU and the current vehicle, traveling directions of the VRU and the current vehicle, a relative speed between the VRU and the current vehicle, whether the VRU and the current vehicle are in the same lane, and a distance between the VRU and the current vehicle.

The remote driving entity uses a target driving policy for the vehicle in a case that the vehicle is in the dynamic safety region. The target driving policy includes at least one of the following:

skipping performing remote control driving;
performing remote control driving only in an emergency situation; and
performing remote control driving with a first computing power resource, the first computing power resource being less than a target resource threshold.

That is, in the dynamic safety region, vehicle-side autonomous driving of the vehicle is exclusively or primarily used and remote control driving is not used or less frequently used.

Due to high safety in the dynamic safety region, in use of vehicle-side autonomous driving, the vehicle can increase a traveling speed of the vehicle as much as possible while complying with a speed limit.

In summary, in the method provided in this embodiment, the remote driving entity determines the dynamic safety region for the vehicle according to the working condition information, and then performs remote control driving on the vehicle in the dynamic safety region by using the target driving policy. The vehicle in the dynamic safety region is relatively safe. Therefore, the remote driving entity can control the vehicle with no computing power or with a small amount of computing power, thereby saving computing resources of the remote driving entity.

Figure 3:
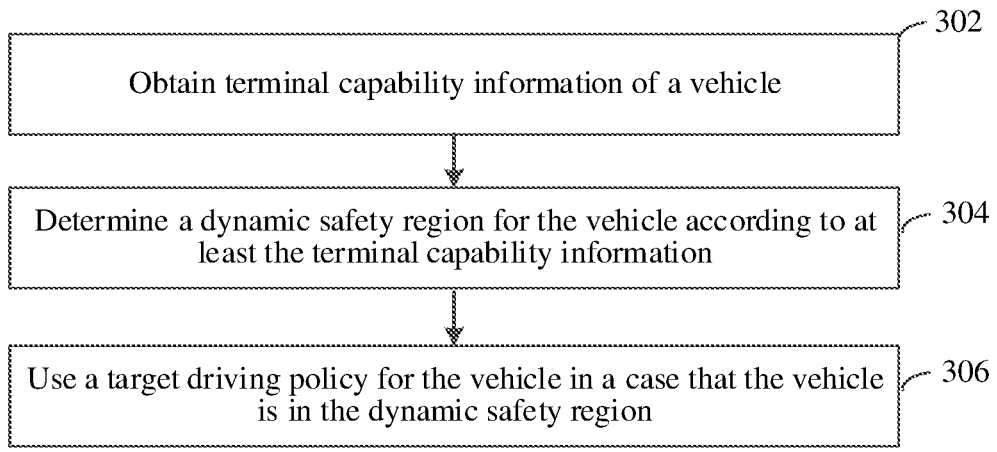
FIG. 3 is a flowchart of a remote driving method according to an exemplary embodiment of this application.

For an embodiment in which working condition information includes terminal capability information of a vehicle:

FIG. 3 is a flowchart of a remote driving method according to an embodiment of this application. This embodiment is described by using an example in which the method is applied to the remote driving entity 10 shown in FIG. 1. The method includes:

Step 302: Obtain terminal capability information of a vehicle.

The terminal capability information is used for indicating at least one of a support capability of the vehicle in terms of autonomous driving and a support capability of the vehicle in terms of remote control driving.

For example, the terminal capability information includes an autonomy level supported by a terminal. For example, a controlled vehicle does not have any automated driving level, or the autonomy level is level L0. For another example, a controlled vehicle can receive a control instruction of the remote driving entity 10 to perform acceleration, steering, and braking operations, and can transmit information of a camera and radar to the remote driving entity 10 in real time. For still another example, a controlled vehicle has automated driving of level L4, and needs remote takeover only in case of a complex working condition.

For example, the terminal capability information includes a controlled capability during the remote control driving, such as whether to support a remote braking function, whether to support a remote steering function, and whether to support a remote acceleration function. In another example, the terminal capability information includes a single vehicle perception capability during the remote control driving, such as whether the terminal supports a camera, whether the terminal supports radar, a quantity and locations of cameras, and a quantity and locations of radar. In another example, the terminal capability information includes a networking support capability during the remote control driving, such as whether to support uploading of data collected by a camera to the remote driving entity 10, whether to support uploading of data collected by radar to the remote driving entity 10, and whether to support uploading of data transmitted by the IoV to the remote driving entity 10.

The terminal capability information is indicated by using a capability level or in a bitmap form. When the terminal capability information is indicated by using a capability level, a correspondence between capability levels is predefined or preconfigured, such as a capability corresponding to a capability level 1 or a capability corresponding to a capability level 2. The terminal determines a capability level of the terminal according to a capability of the terminal. When the terminal capability information is indicated in a bitmap form, a bit sequence with n bits is set, and each bit in the bit sequence corresponds to one capability. That is, each capability corresponds to one bit in the bit sequence, and when a bit value is 1, it indicates that the capability is available; and when the bit value is 0, it indicates that the capability is not available.

A method of reporting the terminal capability information may be preconfigured by the remote driving entity 10 for the vehicle, or may be implemented by the vehicle through dynamic reporting. In an example, the vehicle sends registration information to the remote driving entity 10, the registration information carrying terminal capability information. The remote driving entity 10 obtains the terminal capability information from the registration information, and then the remote driving entity 10 sends a registration response to the vehicle. In another example, the remote driving entity 10 sends a capability inquiry request message to the vehicle. After receiving the capability inquiry request message, the vehicle sends a capability information report message to the remote driving entity 10, the capability information report message carrying the terminal capability information.

This embodiment is applicable to a remote control driving service provided by an original equipment manufacturer (OEM) and a remote control driving service provided by a third-party service provider.

Step 304: Determine a dynamic safety region for the vehicle according to at least the terminal capability information.

When the terminal capability information is relatively poor, the remote driving entity 10 determines a relatively small dynamic safety region (or even 0) for the vehicle. When the terminal capability information is relatively strong, the remote driving entity 10 determines a relatively large dynamic safety region for the vehicle.

For example, when the terminal capability information indicates that the vehicle supports automated driving of L4 or L5, a relatively large dynamic safety region is determined for the vehicle. When the terminal capability information indicates that the vehicle supports only acceleration, breaking, and steering in the remote control driving, a relatively small dynamic safety region is determined for the vehicle.

The terminal capability information is a factor for determining a dynamic safety region, and the dynamic safety region may be determined according to more than one factor, that is, the terminal capability information is used as one of a plurality of factors for determining the dynamic safety region.

Step 306: Use a target driving policy for the vehicle in a case that the vehicle is in the dynamic safety region.

The target driving policy is used for the vehicle in a case that the vehicle is in the dynamic safety region. The target driving policy includes at least one of the following:

skipping performing remote control driving;
performing remote control driving only in an emergency situation; and
performing remote control driving with a first computing power resource, the first computing power resource being less than a target resource threshold.

The emergency situation is determined based on a preset driving environment condition. For example, there is a landslide 100 meters ahead, a distance from an obstacle ahead is less than a valid braking distance, or a sensor on the vehicle fails.

That is, in the dynamic safety region, vehicle-side automated driving of the vehicle is exclusively or primarily used and remote control driving is not used or less frequently used.

In summary, in the method provided in this embodiment, the remote driving entity determines the dynamic safety region for the vehicle according to the terminal capability information, and then performs remote control driving on the vehicle in the dynamic safety region by using the target driving policy. A vehicle with a relatively strong terminal capability is relatively safe. Therefore, the remote driving entity can control the vehicle with no computing power or with a small amount of computing power, thereby saving computing resources of the remote driving entity.

Figure 4:
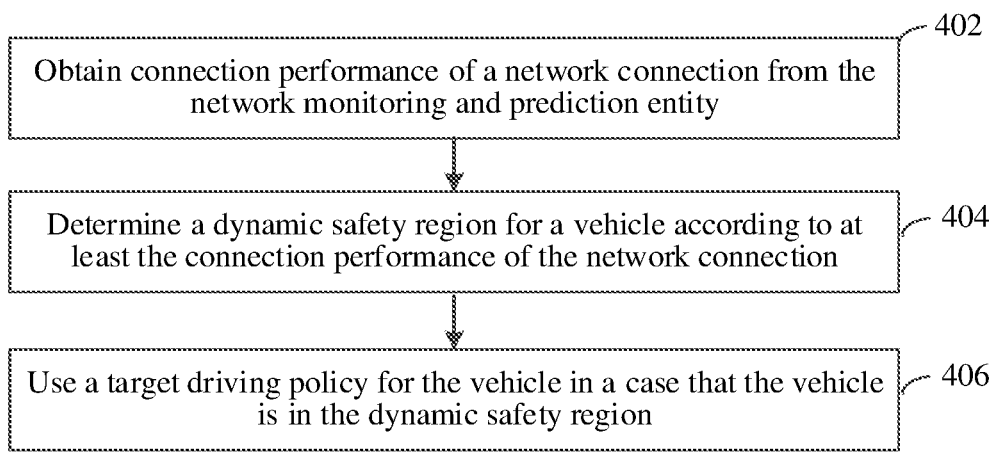
FIG. 4 is a flowchart of a remote driving method according to an exemplary embodiment of this application.

For an embodiment in which working condition information includes connection performance of a network connection of a vehicle:

FIG. 4 is a flowchart of a remote driving method according to an embodiment of this application. This embodiment is described by using an example in which the method is applied to the remote driving entity 10 shown in FIG. 1. The remote driving entity 10 is connected to a network monitoring and prediction entity. The method includes:

Step 402: Obtain connection performance of a network connection of a vehicle from the network monitoring and prediction entity.

The remote driving entity 10 and the vehicle need to implement real-time interaction and collaboration through a communication network. The communication network is a 5G network and a subsequent evolved network. When the vehicle is controlled by the remote driving entity 10, a control instruction needs to be sent from the remote driving entity to the vehicle (or a vehicle-side driving system) and then implemented on the vehicle-side driving system. Connection reliability and/or connection quality of the network connection directly determines whether the control instruction can be transferred to the vehicle in a timely manner.

The network connection is a connection between the remote driving entity and the vehicle. For example, the network connection is a connection in the 5G network, or a connection in the subsequent evolved network of the 5G network.

The network monitoring and prediction entity is an entity configured to monitor the connection performance of the network connection. The network monitoring and prediction entity is an entity configured to predict the connection performance of the network connection. The connection performance includes at least one of: connection reliability and connection quality.

The connection reliability is an indicator for evaluating quality of service (QoS). The connection reliability is represented by using parameters such as a dedicated bandwidth, a network jitter, a network latency, and a packet loss rate. The connection quality is an indicator for evaluating channel quality. The connection quality is represented by using parameters such as a reference signal received power (RSRP) and reference signal received quality (RSRQ).

The network monitoring and prediction entity has a monitoring capability, and obtains real-time or near real-time connection performance of the network connection through monitoring. For example, the network monitoring and prediction entity further has a prediction capability, and obtains connection performance of the network connection within a period of time in the future through prediction.

In an example, the remote driving entity 10 sends an inquiry request to the network monitoring and prediction entity, the inquiry request carrying at least one of an identifier of the vehicle, an identifier of the network connection, and a traveling location of the vehicle. After receiving the inquiry request, the network monitoring and prediction entity sends the connection performance of the network connection to the remote driving entity 10. The identifier of the network connection may be at least one of a radio bearer (RB) identifier, a signaling radio bearer (SRB) identifier, a data radio bearer (DRB) identifier, and a network slice identifier.

For example, the network monitoring and prediction entity periodically sends the connection performance of the network connection to the remote driving entity 10, or proactively sends the connection performance of the network connection to the remote driving entity 10 when an information update occurs.

Step 404: Determine a dynamic safety region for the vehicle according to at least the connection performance of the network connection.

When the connection reliability and/or connection quality of the network connection is relatively poor, the remote driving entity 10 determines a relatively small (or no) dynamic safety region for the vehicle. When the connection reliability and/or connection quality of the network connection is relatively high, the remote driving entity 10 determines a relatively large dynamic safety region for the vehicle.

The connection reliability and/or connection quality of the network connection is a factor for determining a dynamic safety region, and the dynamic safety region may be determined according to more than one factor, that is, the connection performance of the network connection is used as one of a plurality of factors for determining the dynamic safety region.

Step 406: Use a target driving policy for the vehicle when the vehicle is in the dynamic safety region.

The target driving policy is used for the vehicle when the vehicle is in the dynamic safety region. The target driving policy includes at least one of the following:

skipping performing remote control driving;

performing remote control driving only in an emergency situation; and performing remote control driving with a first computing power resource, the first computing power resource being less than a target resource threshold.

That is, in the dynamic safety region, vehicle-side automated driving of the vehicle is exclusively or primarily used and remote control driving is not used or less frequently used.

In summary, in the method provided in this embodiment, the remote driving entity determines the dynamic safety region for the vehicle according to the connection reliability and/or the connection quality of the network connection, and then performs remote control driving on the vehicle in the dynamic safety region by using the target driving policy. Due to increased unexpectedness of a vehicle with a relatively poor network connection during the remote control driving, the remote driving entity can control the vehicle without any computing power or with a small amount of computing power and rely more on vehicle-side automated driving, thereby saving computing resources of the remote driving entity.

Figure 5:
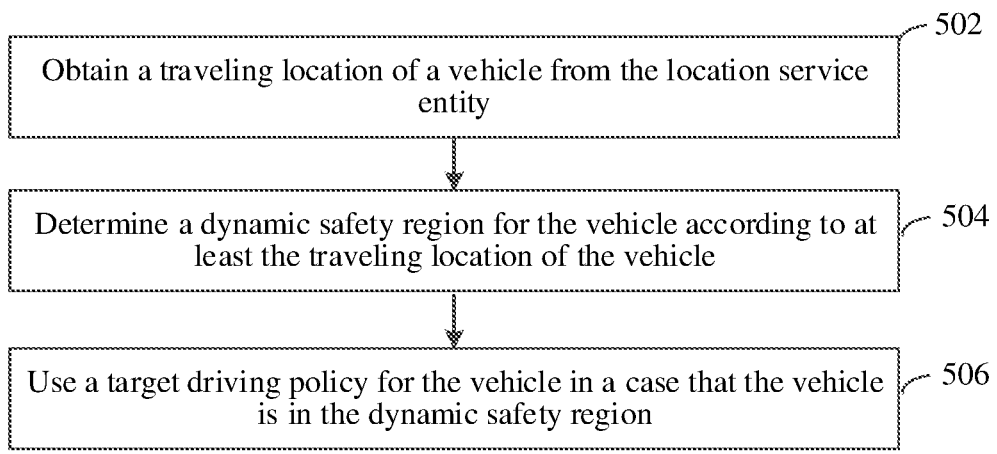
FIG. 5 is a flowchart of a remote driving method according to an exemplary embodiment of this application.

For an embodiment in which working condition information includes a traveling location of a vehicle:

FIG. 5 is a flowchart of a remote driving method according to an embodiment of this application. This embodiment is described by using an example in which the method is applied to the remote driving entity 10 shown in FIG. 1. the remote driving entity 10 is connected to a location service entity. The method includes:

Step 502: Obtain a traveling location of a vehicle from the location service entity.

The traveling location of the vehicle is an important parameter for decision making by the remote driving entity 10 during remote control driving. The remote driving entity 10 obtains the traveling location of the vehicle from the location service entity.

The location service entity is an entity configured to locate the traveling location of the vehicle. The location service entity may locate the traveling location of the vehicle based on the Global Positioning System (GPS), Galileo navigation satellite system, and Beidou Navigation Satellite System. The location service entity may locate the traveling location of the vehicle by using a three-point positioning method based on a base station, or locate the traveling location of the vehicle by using a positioning technology based on a distance difference, or locate the traveling location of the vehicle by using a positioning technology based on an angle difference, or locate the traveling location of the vehicle by using a positioning technology based on a round trip time (RTT) difference of detected echoes. Even, the location service entity may locate the traveling location of the vehicle according to road condition images captured by a camera.

For example, positioning methods used by the location service entity include at least one of the following methods:
- a network-assisted global navigation satellite system method;
- positioning based on a time difference of arrival (TDOA) of Long Term Evolution (LTE) signals;
- an enhanced cell identification method based on LTE signals;
- wireless local area network positioning;
- Bluetooth positioning;
- terrestrial beacon system (TBS) positioning;
- a sensor-based method;
- a barometric pressure sensor;
- a motion sensor;
- a New Radio (NR) enhanced-cell identification (NR e-CID) method based on NR signals;
- multiple RTT positioning, including multiple RTTs based on NR signals;
- a downlink-angle of departure (DL-AoD) based on NR signals;
- a downlink-TDOA (DL-TDOA) based on NR signals;
- an uplink-TDOA (UL-TDOA) based on NR signals;
- an uplink-angle of arrival (UL-AoA), including an A-AoA and a Z-AoA based on NR signals; and
- a positioning method based on a sidelink (SL).

For example, the vehicle may be positioned by using one of the foregoing positioning methods. For example, the vehicle is autonomously positioned by using one of the foregoing methods without the assistance of the location service entity, and then the vehicle reports a positioning result to the location service entity. Alternatively, the foregoing positioning methods may be used in a plurality of combined ways to achieve hybrid positioning.

In an example, the remote driving entity 10 sends a location obtaining request to the location service entity, the location obtaining request carrying an identifier of the vehicle. After receiving the location obtaining request, the location service entity sends the traveling location of the vehicle to the remote driving entity 10.

For example, the location service entity periodically sends the traveling location of the vehicle to the remote driving entity 10, or proactively sends the traveling location of the vehicle to the remote driving entity 10 when an update of the traveling location occurs. The traveling location of the vehicle may be represented by using an absolute position, such as a latitude and longitude location, or may be represented by using a relative position, such as a direction and distance relative to a ground base station.

Step 504: Determine a dynamic safety region for the vehicle according to at least the traveling location of the vehicle.

The remote driving entity 10 determines the dynamic safety region for the vehicle by using the traveling location of the vehicle as a primary reference location. For example, the remote driving entity 10 determines the dynamic safety region for the vehicle by using the traveling location of the vehicle as a starting point of the safety region. For another example, the remote driving entity 10 determines the dynamic safety region for the vehicle by using the traveling location of the vehicle as a center point of the safety region.

The traveling location of the vehicle constantly changes. Therefore, the dynamic safety region for the vehicle needs to be constantly determined according to the traveling location of the vehicle.

The traveling location of the vehicle is a factor for determining a dynamic safety region, and the dynamic safety region may be determined according to more than one factor, that is, the traveling location of the vehicle is used as one of a plurality of factors for determining the dynamic safety region.

Step 506: Use a target driving policy for the vehicle when the vehicle is in the dynamic safety region.

The target driving policy is used for the vehicle when the vehicle is in the dynamic safety region. The target driving policy includes at least one of the following:
- skipping performing remote control driving;
- performing remote control driving only in an emergency situation; and
- performing remote control driving with a first computing power resource, the first computing power resource being less than a target resource threshold.

That is, in the dynamic safety region, vehicle-side automated driving of the vehicle is exclusively or primarily used and remote control driving is not used or less frequently used.

In summary, in the method provided in this embodiment, the remote driving entity determines the dynamic safety region for the vehicle according to the traveling location of the vehicle, and then performs remote control driving on the vehicle in the dynamic safety region by using the target driving policy. The dynamic safety region can be dynamically updated according to the traveling location of the vehicle to determine a more accurate and appropriate dynamic safety region.

Figure 6:
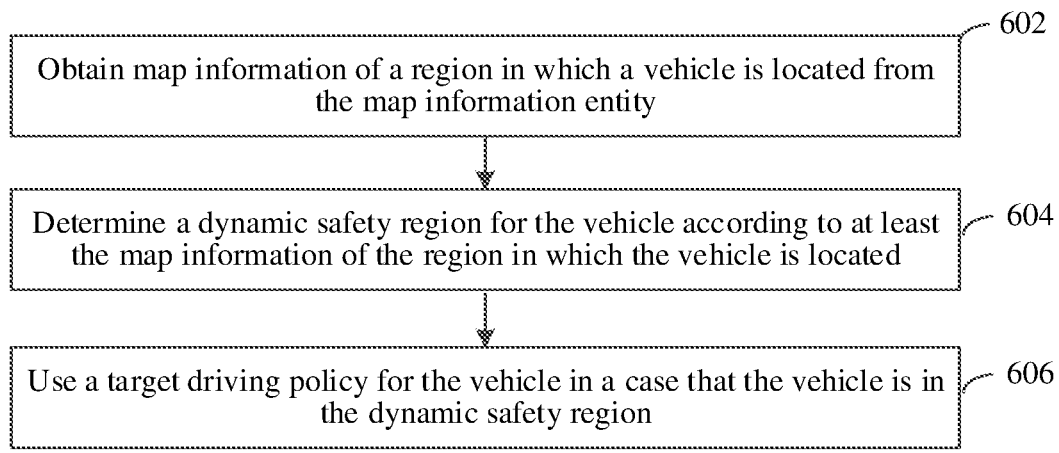
FIG. 6 is a flowchart of a remote driving method according to an exemplary embodiment of this application.

For an embodiment in which working condition information includes map information of a region in which a vehicle is located:

FIG. 6 is a flowchart of a remote driving method according to an embodiment of this application. This embodiment is described by using an example in which the method is applied to the remote driving entity 10 shown in FIG. 1. The remote driving entity 10 is connected to a map information entity. The method includes:

Step 602: Obtain map information of a region in which a vehicle is located from the map information entity.

The map information of the region in which the vehicle is located is also an important parameter for decision making by the remote driving entity 10 during remote control driving. The remote driving entity 10 obtains the map information of the region in which the vehicle is located from the map information entity.

The map information entity is an entity configured to provide map information. For example, the map information entity may provide high-precision map information.

In an example, the remote driving entity 10 sends a map obtaining request to the map information entity, the map obtaining request carrying at least one of an identifier of the vehicle and a traveling location of the vehicle. After receiving the map obtaining request, the map information entity sends the map information of the region in which the vehicle is located to the remote driving entity 10. The traveling location of the vehicle is an absolute position or a relative position. The absolute position may be represented by using latitude and longitude. The relative position may be represented by using a direction and a distance relative to a reference point. For example, the reference point is a base station A, and a direction and a distance relative to the base station A are respectively represented by using a beam direction and a timing advance.

For example, the region is divided by the map information entity, and a size of the region is fixed or dynamically adjusted. For example, a relatively large region is obtained through division when a network status is relatively good; and a relatively small region is obtained through division when the network status is relatively poor.

The map information includes basic map information, such as a normal-precision map or a high-precision map. In some examples, the map information further includes real-time road information. The real-time road information includes, but is not limited to at least one of: congestion information, construction information, landslide information, rockfall information, traffic accident information, flood information, and extreme weather information.

For example, the map information entity periodically sends the map information of the region in which the vehicle is located to the remote driving entity 10. Alternatively, the remote driving entity 10 proactively obtains the map information of the region in which the vehicle is located from the map information entity when an update of the traveling location occurs. Alternatively, the remote driving entity 10 proactively obtains map information of a next region from the map information entity when the vehicle leaves a previous region or is about to leave the previous region.

Step 604: Determine a dynamic safety region for the vehicle according to at least the map information of the region in which the vehicle is located.

The remote driving entity 10 determines the dynamic safety region for the vehicle by using the map information of the region in which the vehicle is located as a reference. For example, the remote driving entity 10 determines a relatively large dynamic safety region for the vehicle when the region in which the vehicle is located is a highway without a limited speed; and determines a relatively small dynamic safety region when the region in which the vehicle is located is an urban commuter road section. For another example, the remote driving entity 10 determines a relatively small dynamic safety region in the presence of map information of an accident such as a landslide, a rockfall, or a flood in the region in which the vehicle is located; and determines a relatively large dynamic safety region in the absence of map information of any accident in the region in which vehicle is located.

The map information of the region in which the vehicle is located constantly changes. Therefore, the dynamic safety region for the vehicle needs to be constantly determined according to the map information of the region in which the vehicle is located.

The map information of the region in which the vehicle is located is a factor for determining a dynamic safety region, and the dynamic safety region may be determined according to more than one factor, that is, the map information of the region in which the vehicle is located is used as one of a plurality of factors for determining the dynamic safety region.

Step 606: Use a target driving policy for the vehicle when the vehicle is in the dynamic safety region.

The target driving policy is used for the vehicle when the vehicle is in the dynamic safety region. The target driving policy includes at least one of the following:
skipping performing remote control driving;
performing remote control driving only in an emergency situation; and
performing remote control driving with a first computing power resource, the first computing power resource being less than a target resource threshold.

That is, in the dynamic safety region, vehicle-side automated driving of the vehicle is exclusively or primarily used and remote control driving is not used or less frequently used.

In summary, in the method provided in this embodiment, the remote driving entity determines the dynamic safety region for the vehicle according to the map information of the region in which the vehicle is located, and then performs remote control driving on the vehicle in the dynamic safety region by using the target driving policy. The dynamic safety region can be dynamically updated according to the map information of the region in which the vehicle is located to determine a more accurate and appropriate dynamic safety region.

Figure 7:
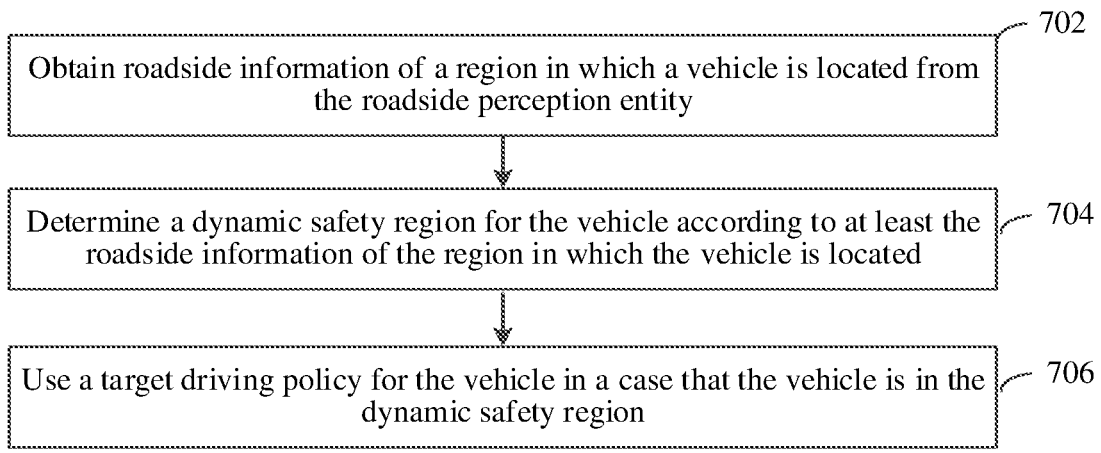
FIG. 7 is a flowchart of a remote driving method according to an exemplary embodiment of this application.

For an embodiment in which working condition information includes roadside information of a region in which a vehicle is located:

FIG. 7 is a flowchart of a remote driving method according to an embodiment of this application. This embodiment is described by using an example in which the method is applied to the remote driving entity 10 shown in FIG. 1. The remote driving entity 10 is connected to a roadside perception entity. The method includes:

Step 702: Obtain roadside information of a region in which a vehicle is located from the roadside perception entity.

The roadside information of the region in which the vehicle is located includes at least one of: legacy vehicle information and VRU information. The roadside information is also an important parameter for decision making by the remote driving entity 10 during remote control driving. The remote driving entity 10 obtains the roadside information of the region in which the vehicle is located from the roadside perception entity.

The roadside perception entity is an entity configured to provide roadside information. For example, the roadside perception entity may obtain the roadside information through roadside facilities, the IoV, cameras, and in other manners. For example, the roadside perception entity collects information about a legacy vehicle through the IoV. For another example, the roadside perception entity obtains roadside information of a roadside pedestrian or animal through a color camera, an infrared camera, a depth camera, or the like.

In an example, the remote driving entity 10 sends a roadside obtaining request to the roadside perception entity, the roadside obtaining request carrying at least one of an identifier of the vehicle and a traveling location of the vehicle. After receiving the roadside obtaining request, the roadside perception entity sends the roadside information of the region in which the vehicle is located to the remote driving entity 10. The traveling location of the vehicle is an absolute position or a relative position. The absolute position may be represented by using latitude and longitude. The relative position may be represented by using a direction and a distance relative to a reference point. For example, the reference point is a base station A, and a direction and a distance relative to the base station A are respectively represented by using a beam direction and a timing advance.

For example, the region is divided by the roadside perception entity, and a size of the region is fixed or dynamically adjusted. For example, a relatively large region is obtained through division when a network status is relatively good; and a relatively small region is obtained through division when the network status is relatively poor.

For example, the roadside perception entity periodically sends the roadside information of the region in which the vehicle is located to the remote driving entity 10. Alternatively, the remote driving entity 10 proactively obtains the roadside information of the region in which the vehicle is located from the roadside perception entity when an update of the traveling location occurs. Alternatively, the remote driving entity 10 proactively obtains roadside information of a next region from the roadside perception entity when the vehicle leaves a previous region or is about to leave the previous region.

The legacy vehicle information includes at least one of: a traveling location, a speed, a traveling direction, a network connection status, and terminal capability information of a legacy vehicle. The VRU information includes at least one of: a geographical location, a speed, a walking direction, a network connection status, and terminal capability information of a VRU.

Step 704: Determine a dynamic safety region for the vehicle according to at least the roadside information of the region in which the vehicle is located.

The remote driving entity 10 determines the dynamic safety region for the vehicle by using the roadside information of the region in which the vehicle is located as a reference. For example, the remote driving entity 10 determines a relatively large dynamic safety region for the vehicle when there is no errant legacy vehicle in the region in which the vehicle is located; determines a relatively large dynamic safety region for the vehicle when a legacy vehicle in the region in which the vehicle is located and the controlled vehicle are in different lanes and a distance therebetween is greater than a threshold; determines a relatively small dynamic safety region for the vehicle when the legacy vehicle in the region in which the vehicle is located and the controlled vehicle are in the same lane and the distance therebetween is less than the threshold; determines a relatively large dynamic safety region for the vehicle when the legacy vehicle in the region in which the vehicle is located and the controlled vehicle are in opposite lanes; determines a relatively large dynamic safety region for the vehicle when a VRU in the region in which the vehicle is located is in a rear region of the controlled vehicle; and determines a relatively small dynamic safety region for the vehicle when the VRU in the region in which the vehicle is located is in a front region of the controlled vehicle.

The roadside information of the region in which the vehicle is located constantly changes. Therefore, the dynamic safety region for the vehicle needs to be constantly determined according to the roadside information of the region in which the vehicle is located.

The roadside information of the region in which the vehicle is located is a factor for determining a dynamic safety region, and the dynamic safety region may be determined according to more than one factor, that is, the roadside information of the region in which the vehicle is located is used as one of a plurality of factors for determining the dynamic safety region.

Step 706: Use a target driving policy for the vehicle when the vehicle is in the dynamic safety region.

The target driving policy is used for the vehicle when the vehicle is in the dynamic safety region. The target driving policy includes at least one of the following:
  skipping performing remote control driving;
  performing remote control driving only in an emergency situation; and
  performing remote control driving with a first computing power resource, the first computing power resource being less than a target resource threshold.

That is, in the dynamic safety region, vehicle-side automated driving of the vehicle is exclusively or primarily used and remote control driving is not used or less frequently used.

In summary, in the method provided in this embodiment, the remote driving entity determines the dynamic safety region for the vehicle according to the roadside information of the region in which the vehicle is located, and then performs remote control driving on the vehicle in the dynamic safety region by using the target driving policy. The dynamic safety region can be dynamically updated according to the roadside information of the region in which the vehicle is located to determine a more accurate and appropriate dynamic safety region.

Figure 8:
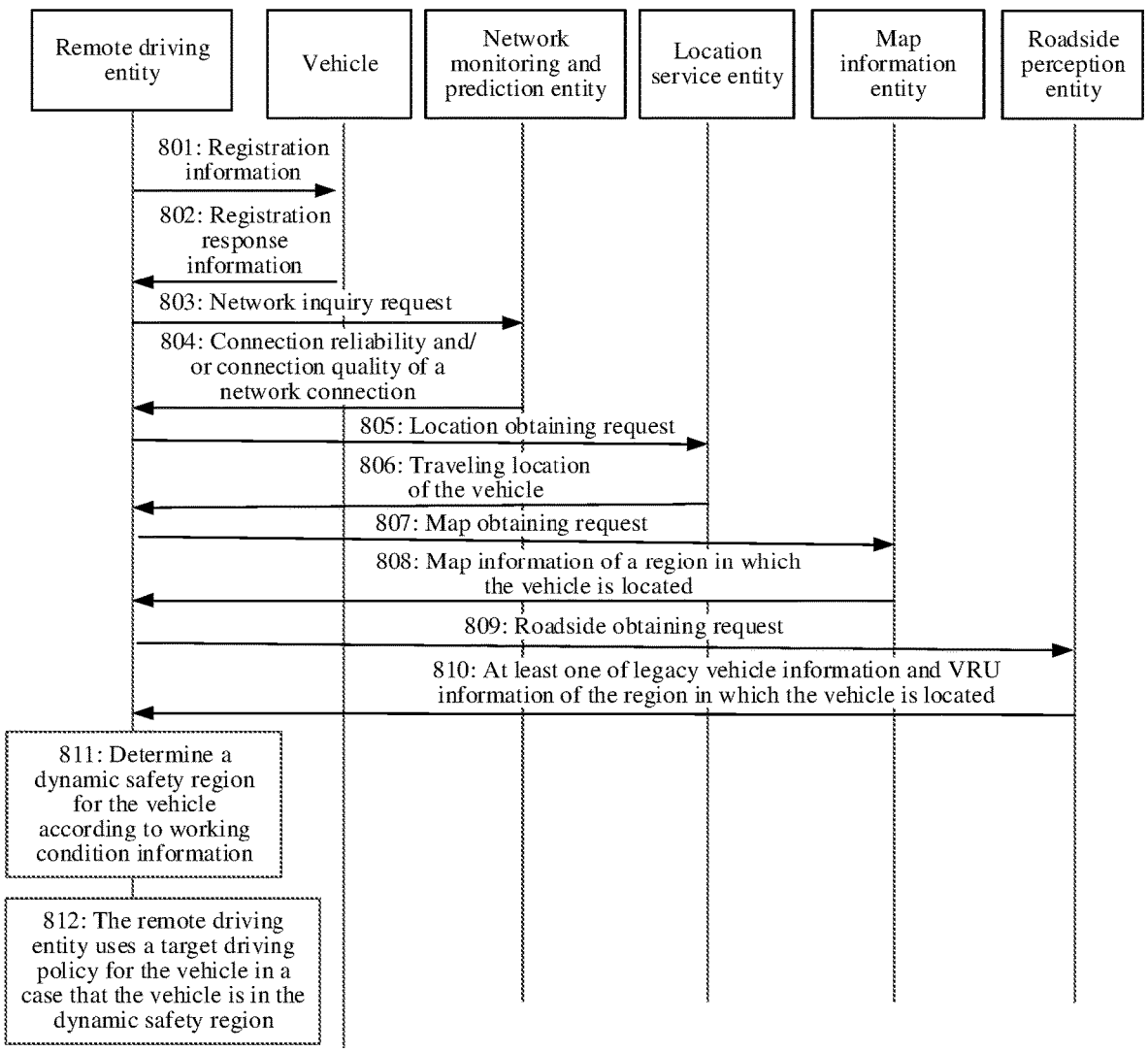
FIG. 8 is a flowchart of a remote driving method according to an exemplary embodiment of this application.

For an embodiment in which working condition information includes a plurality of types of information:

FIG. 8 is a flowchart of a remote driving method according to an embodiment of this application. This embodiment is described by using an example in which the method is applied to the remote driving entity 10 shown in FIG. 1. The method includes:

Step 801: The remote driving entity receives registration information sent by a vehicle, the registration information carrying terminal capability information.

The terminal capability information is used for indicating at least one of a support capability of the vehicle in terms of automated driving and a support capability of the vehicle in terms of remote control driving. The terminal capability information is one type of working condition information.

For example, the terminal capability information includes an autonomy level supported by a terminal.

For example, the terminal capability information includes at least one of: a controlled capability during the remote control driving, a single vehicle perception capability during the remote control driving, and a networking support capability during the remote control driving.

The terminal capability information is indicated by using a capability level or in a bitmap form. When the terminal capability information is indicated by using a capability level, a correspondence between capability levels is predefined or preconfigured. The terminal determines a capability level of the terminal according to a capability of the terminal. When the terminal capability information is indicated in a bitmap form, a bit sequence with n bits is set, and each bit in the bit sequence corresponds to one capability. That is, each capability corresponds to one bit in the bit sequence, and when a bit value is 1, it indicates that the capability is available; and when the bit value is 0, it indicates that the capability is not available.

The remote driving entity obtains the terminal capability information from the registration information. Optionally, the remote driving entity further obtains a vehicle identifier of the vehicle. The vehicle identifier may be represented by using a terminal identifier of a vehicle-side driving entity, for example, a vehicle-side physical identifier, or a cell temporary identifier of the vehicle-side driving entity in a mobile communication network.

Step 802: The remote driving entity sends registration response information to the vehicle.

Step 803: The remote driving entity sends a network inquiry request to a network monitoring and prediction entity.

A network connection is a connection between the remote driving entity and the vehicle. For example, the network connection is a connection in a 5G network, or a connection in a subsequent evolved network of the 5G network.

The network inquiry request is used for inquiring at least one of connection reliability and connection quality of the network connection. The inquiry request may also be referred to as a monitoring request, a prediction request, a synchronous request, an obtaining request, or other names.

The network inquiry request carries at least one of an identifier of the vehicle, an identifier of the network connection, and a traveling location of the vehicle. The identifier of the network connection may be at least one of an RB identifier, an SRB identifier, a DRB identifier, and a network slice identifier.

Step 804: The network monitoring and prediction entity sends at least one of connection reliability and connection quality of a network connection to the remote driving entity.

After receiving the network inquiry request, the network monitoring and prediction entity sends the connection reliability and/or the connection quality of the network connection to the remote driving entity.

The connection reliability and/or the connection quality of the network connection is obtained by the network monitoring and prediction entity through monitoring. Alternatively, the connection reliability and/or the connection quality of the network connection is obtained by the network monitoring and prediction entity through prediction.

The connection reliability and/or the connection quality of the network connection is one type of working condition information.

Step 805: The remote driving entity sends a location obtaining request to a location service entity.

The location obtaining request carries an identifier of the vehicle.

Step 806: The location service entity sends a traveling location of the vehicle to the remote driving entity.

The traveling location of the vehicle may be represented by using an absolute position, such as a latitude and longitude location, or may be represented by using a relative position, such as a direction and distance relative to a ground base station (or other reference objects).

Step 807: The remote driving entity sends a map obtaining request to a map information entity.

The remote driving entity sends a map obtaining request to the map information entity, the map obtaining request carrying at least one of an identifier of the vehicle and a traveling location of the vehicle. The traveling location of the vehicle is an absolute position or a relative position.

Step 808: The map information entity sends map information of a region in which the vehicle is located to the remote driving entity.

After receiving the map obtaining request, the map information entity sends the map information of the region in which the vehicle is located to the remote driving entity.

For example, when the map obtaining request carries the identifier of the vehicle, the map information entity obtains the traveling location of the vehicle from the location service entity according to the identifier of the vehicle, and sends the map information of the region in which the vehicle is located to the remote driving entity according to the traveling location of the vehicle.

For example, when the map obtaining request carries the traveling location of the vehicle, the map information of the region in which the vehicle is located is sent to the remote driving entity according to the traveling location of the vehicle.

The map information includes basic map information. In some examples, the map information further includes real-time road information. The real-time road information includes, but is not limited to at least one of: congestion information, construction information, landslide information, rockfall information, traffic accident information, flood information, and extreme weather information.

The basic map information is one type of working condition information.

Step 809: The remote driving entity sends a roadside obtaining request to a roadside perception entity.

The remote driving entity sends a roadside obtaining request to the roadside perception entity, the roadside obtaining request carrying at least one of an identifier of the vehicle and a traveling location of the vehicle.

Step 810: The roadside perception entity sends at least one of legacy vehicle information and VRU information of the region in which the vehicle is located to the remote driving entity.

The roadside perception entity percepts legacy vehicle information and VRU information within the target region by using at least one of the following sensors: a camera, radar, an infrared sensor, and a millimeter wave radar. After receiving the roadside obtaining request, the roadside perception entity sends roadside information of the region in which the vehicle is located to the remote driving entity. The roadside information of the region in which the vehicle is located includes at least one of: legacy vehicle information and VRU information.

The legacy vehicle information includes at least one of: a traveling location, a speed, a traveling direction, a network connection status, and terminal capability information of a legacy vehicle. The VRU information includes at least one of: a geographical location of a pedestrian or an animal, a speed, a walking direction, and a network connection status, and terminal capability information of a portable terminal carried by the pedestrian.

The legacy vehicle information is one type of working condition information. The VRU information is also one type of working condition information.

A timing of obtaining the foregoing various working condition information is not limited in this embodiment. The remote driving entity can obtain each piece of the working condition information in different sequential orders, in different obtaining manners (proactively or passively), and at different obtaining frequencies. In some embodiments, processes of obtaining the various working condition information are independent of each other. In some embodiments, there are dependencies in some processes of obtaining the working condition information. For example, the traveling location of the vehicle needs to be first obtained, and then the map information and the roadside information are obtained according to the traveling location of the vehicle.

Step 811: The remote driving entity determines a dynamic safety region for the vehicle according to working condition information.

The remote driving entity comprehensively determines the dynamic safety region for the vehicle according to various types of working condition information. The various types of working condition information can be used in a cascading manner during determining of the dynamic safety region for the vehicle by using the various types of working condition information.

For example, there are at least two types of working condition information corresponding to respective priorities. The remote driving entity determines the dynamic safety region for the vehicle by preferentially using working condition information with a high priority.

For example, there is first working condition information and second working condition information in the various types of working condition information, and a priority of the first working condition information is higher than a priority of the second working condition information. The first working condition information is any one of the various types of working condition information. The second working condition information is any one of the various types of working condition information other than the first working condition information.

The remote driving entity determines a first dynamic safety region for the vehicle according to the first working condition information with a high priority; and then determines a second dynamic safety region for the vehicle in the first dynamic safety region according to the second working condition information with a low priority.

When there are at least three types of working condition information, the remote driving entity determines a first dynamic safety region for the vehicle according to the first working condition information with a highest priority; then determines a second dynamic safety region for the vehicle in the first dynamic safety region according to the second working condition information with a second highest priority; and then determines a third dynamic safety region for the vehicle in the second dynamic safety region according to the third working condition information with a low priority; and so on, until a finally determined dynamic safety region is obtained.

In an example, a target region is a region determined by using the traveling location of the vehicle as a reference. The target region is a candidate region for the dynamic safety region. The principle of determining the target region as the dynamic safety region by the remote driving entity includes, but is not limited to, at least one of the following:

A KPI of the network connection in the target region reaches a threshold required by the remote control driving.

For example, the KPI of the network connection between the vehicle and the remote driving entity is higher than the threshold. That the KPI is higher than the threshold includes, but is not limited to at least one of the following: a transmission latency of the network connection is less than a first threshold, a packet loss rate of the network connection is less than a second threshold, stability of the network connection is higher than a third threshold, and mobility of the network connection is higher than a fourth threshold.

There is no hazardous road condition in the target region. The hazardous road condition includes at least one of: congestion information, construction information, landslide information, rockfall information, traffic accident information, flood information, extreme weather information, and an errant vehicle.

A distribution status of legacy vehicles in the target region meets a first safety condition.

A legacy vehicle cannot perform V2X communication with the current vehicle to coordinate driving behaviors, and/or the legacy vehicle does not support remote control driving through a remote driving entity located on a cloud. Therefore, a peripheral region of the legacy vehicle is not suitable for classification as a dynamic safety region. A region in which the legacy vehicle does not affect the current vehicle can be classified as a dynamic safety region. A region in which the legacy vehicle may affect the current vehicle cannot be classified as a dynamic safety region.

For example, the assessment of whether the legacy vehicle affects safety of the current vehicle may be obtained by performing a collision prediction based on at least one of the following factors: locations of the legacy vehicle and the current vehicle, traveling directions of the legacy vehicle and the current vehicle, a relative speed between the legacy vehicle and the current vehicle, whether the legacy vehicle and the current vehicle are in the same lane, and a distance between the legacy vehicle and the current vehicle.

The first safety condition includes, but is not limited to, at least one of the following:
- a distance between the legacy vehicle and the current vehicle is greater than a first threshold;
- the legacy vehicle and the current vehicle are in opposite lanes;
- the legacy vehicle and the current vehicle are in opposite lanes, and a lane distance is greater than a second threshold;
- the legacy vehicle and the current vehicle are in different lanes in the same direction;
- the legacy vehicle and the current vehicle are in different lanes in the same direction, and a lane distance is greater than a third threshold;
- a state of a driver of the legacy vehicle meets a safety condition, for example, the driver is more than 18 years old and less than 50 years old; and
- a driving history of the legacy vehicle meets a safety condition.

A distribution status of VRUs in the target region meets a second safety condition.

Due to an unpredictable action mode of a VRU, a peripheral region of the VRU is not suitable for classification as a dynamic safety region. A region in which the VRU does not affect the current vehicle can be classified as a dynamic safety region. A region in which the VRU may affect the current vehicle cannot be classified as a dynamic safety region.

For example, the assessment of whether the VRU affects safety of the current vehicle may be obtained by performing a collision prediction based on at least one of the following factors: locations of the VRU and the current vehicle, traveling directions of the VRU and the current vehicle, a relative speed between the VRU and the current vehicle, whether the VRU and the current vehicle are in the same lane, and a distance between the VRU and the current vehicle.

The second safety condition includes, but is not limited to, at least one of the following:
- a distance between the VRU and the current vehicle is greater than a first threshold;
- the VRU and the current vehicle are in opposite lanes;

the VRU and the current vehicle are in opposite lanes, and a lane distance is greater than a second threshold;

the VRU and the current vehicle are in different lanes in the same direction;

the VRU and the current vehicle are in different lanes in the same direction, and a lane distance is greater than a third threshold;

a state of the VRU meets a safety condition, for example, the VRU is more than 18 years old and less than 50 years old; and a traveling history of the VRU meets a safety condition.

Step 812: The remote driving entity uses a target driving policy for the vehicle in a case that the vehicle is in the dynamic safety region.

The target driving policy includes at least one of the following policies:

skipping using the remote control driving;

performing remote control driving only in an emergency situation; and performing remote driving with a first computing power resource, the first computing power resource being less than a target resource threshold.

That is, in the dynamic safety region, vehicle-side automated driving of the vehicle is exclusively or primarily used and remote control driving is not used or less frequently used. The dynamic safety region is divided according to a granularity, the granularity including at least one of an administrative region, a road section, and a lane.

In summary, in the method provided in this embodiment, the remote driving entity determines the dynamic safety region for the vehicle according to various types of working condition information, and then performs remote control driving on the vehicle in the dynamic safety region by using the target driving policy, so that resources occupied by the remote control driving can be reduced and automated driving can be used as much as possible.

In the method provided in this embodiment, when there are various types of working condition information, the dynamic safety region is sequentially narrowed according to the working condition information in descending order of priorities, so that a more accurate dynamic safety region that conforms to each piece of working condition information can be obtained, and the remote driving entity can control the vehicle with no computing power or with a small amount of computing power, thereby saving computing resources of the remote driving entity.

Figure 9:
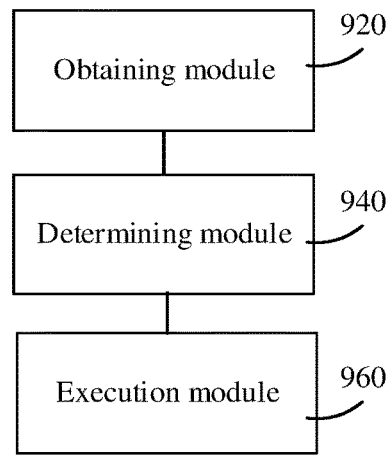
FIG. 9 is a block diagram of a remote driving apparatus according to an exemplary embodiment of this application.

FIG. 9 is a block diagram of a remote driving apparatus according to an embodiment of this application. The apparatus may be implemented as a remote driving entity or part of a remote driving entity. The apparatus includes:

an obtaining module 920, configured to obtain working condition information of a vehicle; and a determining module 940, configured to determine a dynamic safety region for the vehicle according to the working condition information;

the dynamic safety region being a region in which vehicle autonomous driving is used and no remote control driving is required, or the dynamic safety region being a region in which the vehicle autonomous driving is used and a degree of involvement of the remote control driving is lower than a predetermined degree.

In a possible implementation of this application, the working condition information includes at least one of the following information:

terminal capability information of the vehicle;

connection performance of a network connection, the connection performance including connection reliability and/or connection quality, and the network connection being a connection between the apparatus and the vehicle;

a traveling location of the vehicle;

map information of a region in which the vehicle is located;

legacy vehicle information of the region in which the vehicle is located; and

VRU information of the region in which the vehicle is located.

In a possible implementation of this application, the apparatus is connected to the vehicle; and the obtaining module 920 is configured to receive the terminal capability information reported by the vehicle.

In a possible implementation of this application, the apparatus is connected to a network monitoring entity; and the obtaining module 920 is configured to obtain at least one of connection reliability and connection quality of the network connection from the network monitoring entity, the network connection being a network connection between the apparatus and the vehicle.

In a possible implementation of this application, the apparatus is connected to a location service entity; and the obtaining module 920 is configured to obtain the traveling location of the vehicle from the location service entity.

In a possible implementation of this application, the apparatus is connected to a map information entity; and the obtaining module 920 is configured to obtain the map information of the region in which the vehicle is located from the map information entity.

In a possible implementation of this application, the apparatus is connected to a roadside perception entity; and the obtaining module 920 is configured to obtain at least one of the legacy vehicle information and the VRU information of the region in which the vehicle is located from the roadside perception entity.

In a possible implementation of this application, there are at least two types of working condition information corresponding to respective priorities; and the determining module 940 is configured to determine the dynamic safety region for the vehicle by preferentially using working condition information with a high priority.

In a possible implementation of this application, there is first working condition information and second working condition information, and a priority of the first working condition information is higher than a priority of the second working condition information; and the determining module 940 is configured to determine a first dynamic safety region for the vehicle according to the first working condition information with a high priority; and determine a second dynamic safety region for the vehicle in the first dynamic safety region according to the second working condition information with a low priority.

In a possible implementation of this application, conditions for determining the dynamic safety region include at least one of the following conditions:

a KPI of the network connection in a target region reaches a threshold required by the remote control driving, the network connection being a connection between the remote driving entity and the vehicle;

there is no hazardous road condition in the target region;

a distribution status of legacy vehicles in the target region meets a first safety condition; and a distribution status of VRUs in the target region meets a second safety condition;

the target region being a candidate region for the dynamic safety region.

In a possible implementation of this application, the apparatus further includes: an execution module 960, configured to use a target driving policy for the vehicle in a case that the vehicle is in the dynamic safety region;
the target driving policy including at least one of the following policies:
skipping using the remote control driving;
performing the remote control driving only in an emergency situation; and
performing remote driving with a first computing power resource, the first computing power resource being less than a target resource threshold.

In a possible implementation of this application, the dynamic safety region is divided according to a granularity, the granularity including at least one of an administrative region, a road section, and a lane.

This application further provides a computer device (such as a server), including a processor and a memory, the memory storing at least one instruction, and the at least one instruction being loaded and executed by the processor to implement the remote driving method provided in the foregoing method embodiments. The computer device may be a computer device provided below in FIG. 10.

Figure 10:
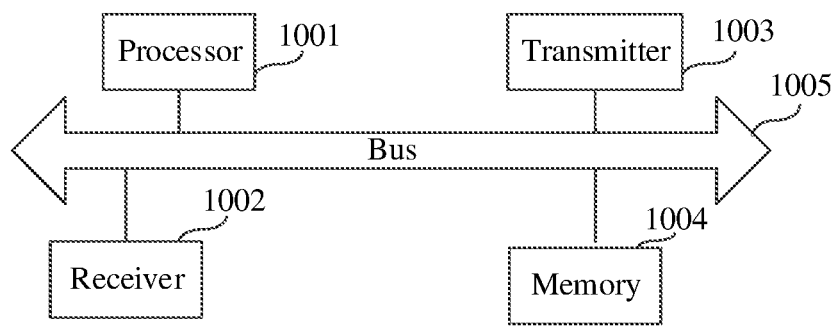
FIG. 10 is a block diagram of a computer device according to an exemplary embodiment of this application.

FIG. 10 is a schematic structural diagram of a computer device according to an exemplary embodiment of this application. The computer device includes a processor 1001, a receiver 1002, a transmitter 1003, a memory 1004, and a bus 1005.

The processor 1001 includes one or more processing cores. The processor 1001 runs a software program and a module to perform various function applications and information processing.

The receiver 1002 and the transmitter 1003 may be implemented as a communication component. The communication a component may be a communication chip.

The memory 1004 is connected to the processor 1001 through the bus 1005.

The memory 1004 may be configured to store at least one instruction. The processor 1001 is configured to execute the at least one instruction to implement the steps in the foregoing method embodiments.

For example, the processor 1001 implements the sending step in the foregoing method embodiments through the transmitter 1003, and the processor 1001 implements the receiving step in the foregoing method embodiments through the receiver 1002. The processor 1001 is further configured to implement the steps in the foregoing method embodiments other than the sending and receiving steps.

This application provides a computer-readable storage medium, storing at least one instruction, the at least one instruction being loaded and executed by a processor to implement the remote driving method provided in the foregoing method embodiments.

This application further provides a computer program product, the computer program product, when run on a computer, causing the computer to perform the remote driving method according to the foregoing method embodiments.

The sequence numbers of the foregoing embodiments of this application are merely for description purpose, and are not intended to indicate the preference among the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A remote driving method, applied to a remote driving entity, and comprising:
obtaining working condition information of a vehicle, wherein the remote driving entity is connected to the vehicle, the working condition information comprises at least terminal capability information of the vehicle, and the obtaining the working condition information of the vehicle comprises: receiving the terminal capability information reported by the vehicle;
determining a dynamic safety region for the vehicle according to the working condition information; and
performing remote driving on the vehicle using a target driving policy for the vehicle when the vehicle is in the dynamic safety region, wherein the target driving policy comprising at least one: skipping using the remote control driving; performing the remote control driving only in an emergency situation; or performing remote driving with a first computing power resource, the first computing power resource being less than a target resource threshold.

2. The method according to claim 1, wherein the dynamic safety region is a region in which vehicle autonomous driving is used and no remote control driving is required, or the dynamic safety region is a region in which the vehicle autonomous driving is used and a degree of involvement of the remote control driving is lower than a predetermined degree.

3. The method according to claim 1, wherein the working condition information further comprises at least one of the following information:
connection performance of a network connection, the connection performance comprising at least one of connection reliability and connection quality, and the network connection being a connection between the remote driving entity and the vehicle;
a traveling location of the vehicle;
map information of a region in which the vehicle is located;
legacy vehicle information of the region in which the vehicle is located, the legacy vehicle information being information about a vehicle supporting no networking function; or
vulnerable road user (VRU) information of the region in which the vehicle is located.

4. The method according to claim 3, wherein the remote driving entity is connected to a network monitoring entity; and
the obtaining working condition information comprises:
obtaining the connection performance of the network connection from the network monitoring entity, the network connection being a network connection between the remote driving entity and the vehicle, and the connection performance comprising at least one of connection reliability and connection quality.

5. The method according to claim 3, wherein the remote driving entity is connected to a location service entity; and the obtaining working condition information further comprises:
obtaining the traveling location of the vehicle from the location service entity.

6. The method according to claim 3, wherein the remote driving entity is connected to a map information entity; and
the obtaining working condition information further comprises:
obtaining the map information of the region in which the vehicle is located from the map information entity.

7. The method according to claim 3, wherein the remote driving entity is connected to a roadside perception entity; and
the obtaining working condition information further comprises:
obtaining at least one of the legacy vehicle information and the VRU information of the region in which the vehicle is located from the roadside perception entity.

8. The method according to claim 1, wherein the working condition information comprises at least two types corresponding to respective priorities; and
the determining a dynamic safety region for the vehicle according to the working condition information comprises:
determining the dynamic safety region for the vehicle by using the working condition information with a high priority.

9. The method according to claim 8, wherein the working condition information comprises first working condition information and second working condition information, and a priority of the first working condition information is higher than a priority of the second working condition information; and
the determining the dynamic safety region for the vehicle by using working condition information with a high priority comprises:
determining a first dynamic safety region for the vehicle according to the first working condition information with a high priority; and
determining a second dynamic safety region for the vehicle in the first dynamic safety region according to the second working condition information with a low priority.

10. The method according to claim 1, wherein conditions for determining the dynamic safety region comprise at least one:
a key performance indicator (KPI) of the network connection in a target region reaches a threshold required by the remote control driving, the network connection being a connection between the remote driving entity and the vehicle;
no hazardous road condition is in the target region;
a distribution status of legacy vehicles in the target region meets a first safety condition;
a distribution status of VRUs in the target region meets a second safety condition; or
the target region is a candidate region for the dynamic safety region.

11. An apparatus, comprising:
a memory storing a plurality of instructions; and
a processor configured to execute the plurality of instructions, and upon execution of the plurality of instruction, is configured to:
obtain working condition information of a vehicle, wherein the apparatus is connected to a network monitoring entity, wherein the working condition information comprises connection performance of a network connection, the connection performance comprising at least one of connection reliability and connection quality, and the network connection being a connection between the apparatus and the vehicle, and wherein the processor is configured to obtain the connection performance of the network connection from the network monitoring entity;
determine a dynamic safety region for the vehicle according to the working condition information; and
perform remote driving on the vehicle using a target driving policy for the vehicle when the vehicle is in the dynamic safety region, wherein the target driving policy comprising at least one: skipping using the remote control driving; performing the remote control driving only in an emergency situation; or performing remote driving with a first computing power resource, the first computing power resource being less than a target resource threshold.

12. The apparatus according to claim 11, wherein the dynamic safety region is a region in which vehicle autonomous driving is used and no remote control driving is required, or the dynamic safety region is a region in which the vehicle autonomous driving is used and a degree of involvement of the remote control driving is lower than a predetermined degree.

13. The apparatus according to claim 11, wherein the working condition information further comprises at least one of the following information:
terminal capability information of the vehicle;
a traveling location of the vehicle;
map information of a region in which the vehicle is located;
legacy vehicle information of the region in which the vehicle is located, the legacy vehicle information being information about a vehicle supporting no networking function; or
vulnerable road user (VRU) information of the region in which the vehicle is located.

14. The apparatus according to claim 13, wherein the apparatus is connected to the vehicle, and wherein the processor, upon execution of the plurality of instructions, is further configured to receive the terminal capability information reported by the vehicle.

15. The apparatus according to claim 13, wherein the apparatus is connected to a network monitoring entity, and wherein the processor, upon execution of the plurality of instructions, is further configured to obtain the connection performance of the network connection from the network monitoring entity, the network connection being a network connection between the apparatus and the vehicle, and the connection performance comprising at least one of connection reliability and connection quality.

16. The apparatus according to claim 13, wherein the apparatus is connected to a location service entity, and wherein the processor, upon execution of the plurality of instructions, is further configured to obtain location information of the vehicle from the location service entity.

17. The apparatus according to claim 13, wherein the apparatus is at least one of:
connected to a map information entity, and the processor, upon execution of the plurality of instructions, is further configured to obtain the map information of the region in which the vehicle is located from the map information entity; or
connected to a roadside perception entity, and the processor, upon execution of the plurality of instructions, is further configured to obtain at least one of the legacy vehicle information and the VRU information of the region in which the vehicle is located from the roadside perception entity.

18. A non-transitory computer-readable storage medium storing a plurality of instructions executable by a processor, wherein upon execution by the processor, the plurality of instructions is configured to cause the processor to:

obtain working condition information of a vehicle, wherein the working condition information comprises at least one of: legacy vehicle information of a region in which the vehicle is located or vulnerable road user (VRU) information of the region in which the vehicle is located, the legacy vehicle information being information about the vehicle supporting no networking function, and wherein the plurality of instructions is configured to cause the processor to obtain at least one of the legacy vehicle information or the VRU information of the region in which the vehicle is located from a roadside perception entity connected to a remote driving entity;

determine a dynamic safety region for the vehicle according to the working condition information; and perform remote driving on the vehicle using a target driving policy for the vehicle when the vehicle is in the dynamic safety region, wherein the target driving policy comprising at least one: skipping using the remote control driving; performing the remote control driving only in an emergency situation; or performing remote driving with a first computing power resource, the first computing power resource being less than a target resource threshold.

* * * * *